Patented Mar. 21, 1939

2,151,369

UNITED STATES PATENT OFFICE 2,151,369

N-CYCLOPENTYLAMIDES OF CARBOXYLIC ACIDS

Harold Wilfred Arnold and Paul Rolland Austin, Wilmington, Del., assignors to E. I. du Pont de Nemours & Company, Wilmington, Del., a corporation of Delaware No Drawing. Application June 29, 1937, Serial No. 151,042

10 Claims. (Cl. 260—561)

This invention relates to new compositions of matter and to their preparation. It relates more particularly to N-cyclopentylamides of aliphatic carboxylic acids, especially unsaturated acids, and to methods for their manufacture.

While compounds containing the cyclohexyl radical are commonly known and usually readily available because they are capable of preparation from aromatic compounds, compounds having carbocyclic rings of less than six carbon atoms are not so readily available and quite frequently require special methods and even individual methods for their preparation.

This invention has as an object the preparation of N-cyclopentylamides of aliphatic monocarboxylic acids, especially of unsaturated aliphatic monocarboxylic acids. A still further object is the preparation of new compounds useful as plasticizers, waxes, and insecticides. Other objects will appear hereinafter.

These objects are accomplished by the following invention wherein a cyclopentylamine is reacted with an aliphatic monocarboxylic acid or a halide, ester, amide or anhydride thereof, and the resulting N-cyclopentylamide isolated.

The more detailed practice of the invention is illustrated by the following examples, wherein parts given are by weight unless otherwise stated. There are of course many forms of the invention other than these specific embodiments.

EXAMPLE I

N-cyclopentyllauramide

A solution of 10 parts of cyclopentylamine (B. P. 107–108° C.) in 100 parts of petroleum ether was added dropwise with stirring to a solution of 26 parts of lauric acid chloride in 100 parts of petroleum ether. Gaseous hydrogen chloride was rapidly evolved and considerable heat was generated. As the reaction progressed a white precipitate settled out. After the addition of cyclopentylamine was complete, the mixture was warmed somewhat and stirring continued for 15 minutes. The precipitate was then filtered off and repeatedly washed with small quantities of cold dilute sodium hydroxide solution. In this way a quantitative yield of N-cyclopentyllauramide was obtained. After crystallization from 60% alcohol the substance melted at 55–56° C. and was found on analysis to have a nitrogen content of 5.00% (calculated amount=5.25%).

EXAMPLE II

N-cyclopentylstearamide

A solution of 6 parts of cyclopentylamine in 50 parts of ethyl ether was added dropwise with stirring to a solution of 19 parts of stearic acid chloride in 50 parts of ethyl ether. Gaseous hydrogen chloride was rapidly evolved and the product separated out as a solid, which was removed by filtration and washed repeatedly with cold dilute sodium hydroxide. The yield was quantitative. After crystallization from ethyl alcohol it melted at 67–68° C. and on analysis was found to have a nitrogen content of 3.30% (calculated amount=3.98%).

EXAMPLE III

N-cyclopentylundecylenamide

A mixture of 38 parts of 10-undecenoic acid (from pyrolysis of castor oil) and 38 parts of thionyl chloride was allowed to stand for 20 hours at 30° C. The mixture, consisting for the most part of undecenoic acid chloride, was then warmed in vacuum to remove excess thionyl chloride, after which the residue was dissolved in 30 parts of dry pyridine. To the resulting solution was added dropwise, with stirring, a solution of 15 parts of cyclopentylamine in 20 parts of dry pyridine. Considerable heat was generated in the reaction. The mixture was allowed to stand until cool, and was then poured into a large volume of cold water. The oil which did not dissolve in water was taken up in ethyl ether and the ether solution washed successively with water, dilute hydrochloric acid, and dilute sodium hydroxide, after which it was dried over calcium chloride. The ether was then removed and the residue distilled in vacuo. The N-cyclopentylundecenamide passed over as the fraction (15.5 parts) boiling at 175–181° C./4 mm. It was a light yellow oil of $$N_{20}^D 1.4796$$

which was found on analysis to have a nitrogen content of 5.57% (calculated amount=5.87%).

The process is generic to aliphatic monocarboxylic acids free from amine reactive groups other than the single carboxyl. These may be straight or branched chain, saturated or unsaturated, and unsubstituted or substituted by groups that do not interfere with the amide-forming reaction such as ether, hydroxyl, aryl, aralkyl, thioether, and sulfhydryl groups. Acids containing groups that may react with the amine, such as ketone, ester, aldehyde, nitrile, and amino groups, should, however, be avoided. Specific acids which may be employed in the process include formic, acetic, propionic, butyric, oenanthylic, caprylic, pelargonic, lauric, myristic, palmitic, stearic, allylacetic, 2-pentenoic, angelic, methacrylic, acrylic, linoleic, eleostearic, crotonic, oleic, brassidic, elaidic, nonenoic, decylenic, lactic, mercaptostearic, methoxypropionic, and phenylstearic acids. Unsaturated acids form a particularly select type, though α, β-unsaturated acids, which are often polymerizable, do not in general give as satisfactory results as those in which the unsaturation is further removed from the carboxyl group. Mixtures of acids such as those obtained by hydrolysis of fatty oils, particularly drying and semi-drying oil acids, which contain unsaturated acids, may be employed to advantage, among them linseed oil acids, China-wood oil acids, soya bean oil acids, perilla oil acids, and peanut oil acids. Preferably the acid should be one of the formula RCOOH wherein R is an open chain hydrocarbon radical.

Instead of the free acid, there may be used in the process various amide-forming derivatives thereof, such as the acid anhydride, an acid halide, the acid amide, or an ester of the acid, particularly with a volatile alcohol. Preferably the acid halide is employed.

The process should preferably but not necessarily be carried out in the presence of a liquid diluent which is a solvent for the reactants and a solvent or non-solvent for the amide which is formed. The diluent should be chemically inert toward the reactants but may be of a type, such as a tertiary amine, which acts as an acceptor for any byproduct hydrogen halide. Suitable specific solvents include pyridine, tributylamine, triethylamine, dibutyl ether, dioxane, dimethylaniline, chlorinated aromatic hydrocarbons, and an excess of either reactant. Where the solvent is not an acid acceptor, another material which so functions, such as an alkali or alkaline earth metal carbonate, may be included in the reaction mixture.

Instead of cyclopentylamine itself, there may be employed alkyl-substituted cyclopentylamines such as 2 - methyl-cyclopentylamine, 3 - butylcyclopentylamine, and 2,3 - diethyl - cyclopentyl - amine, and in such instances the substituted cyclopentyl amide of the acid is formed.

The reaction is customarily carried out quite satisfactorily at ordinary pressures, and, while superatmospheric pressure may be used, there is generally no advantage in doing so unless the reaction proceeds so slowly at temperatures below the boiling points of the reactants that higher temperatures are resorted to.

While the examples illustrate the preferred procedure, the invention also contemplates the pyrolysis of the addition salt of cyclopentylamine with the acid. In this variation of the process, the salt may be heated alone or in the presence of a high-boiling solvent such as xylene, phenol, the cresols, and o-hydroxydiphenyl.

The temperature may be varied within wide limits depending upon whether the acid or an amide-forming derivative thereof (and if the latter, which type) is being used. The acid halides generally react smoothly at temperatures of about 15 to 60° C. However, in the case of the free acid and many esters, temperatures of from 100 to 300° C. are usually required, the preferred range being 120 to 225° C. To prevent the loss of amine at high temperatures, closed vessels are advantageous.

The products of the present invention are useful as waxes, plasticizers, and insecticides. They may also be used to prevent sheets of cellulosic materials, such as regenerated cellulose film, from adhering to each other.

The above description and examples are intended to be illustrative only. Any modification of or variation therefrom which conforms to the spirit of the invention is intended to be included within the scope of the claims.

We claim:

1. An N-cyclopentylamide of an aliphatic monocarboxylic acid wherein the amido nitrogen is attached also to a hydrogen atom.

2. An N-cyclopentylamide of an aliphatic monocarboxylic acid of the formula RCOOH wherein R is an open chain hydrocarbon radical and wherein the amido nitrogen is attached also to a hydrogen atom.

3. An amide of the formula

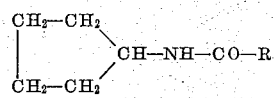

wherein R is an open chain hydrocarbon radical.

4. An amide of the formula

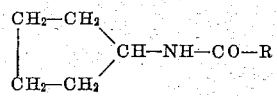

wherein R is a saturated open chain hydrocarbon radical.

5. N-cyclopentylundecylenamide.
6. N-cyclopentyllauramide.
7. N-cyclopentylstearamide.
8. An N-cyclopentylamide of an aliphatic monocarboxylic acid.
9. An N-cyclopentylamide of an aliphatic monocarboxylic acid of the formula RCOOH wherein R is an open chain hydrocarbon radical.
10. An amide of the formula

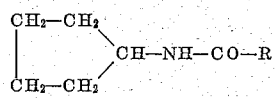

wherein R is an unsaturated open chain hydrocarbon radical.

HAROLD WILFRED ARNOLD.
PAUL ROLLAND AUSTIN.